(12) United States Patent
Labbé

(10) Patent No.: US 6,949,039 B2
(45) Date of Patent: Sep. 27, 2005

(54) DRIVEN PULLEY FOR A CONTINUOUSLY VARIABLE TRANSMISSION

(75) Inventor: Jocelyn Labbé, St-Germain-de-Grantham (CA)

(73) Assignee: Cvtech R&D Inc., Drummondville (CA)

(*) Notice: Subject to any disclaimer, the term of this patent is extended or adjusted under 35 U.S.C. 154(b) by 210 days.

(21) Appl. No.: 10/389,832

(22) Filed: Mar. 17, 2003

(65) Prior Publication Data

US 2004/0185974 A1 Sep. 23, 2004

(51) Int. Cl.[7] .............................................. F16H 59/00
(52) U.S. Cl. .............................................. 474/19; 474/8
(58) Field of Search ........................ 474/8, 9, 10, 11, 474/19

(56) References Cited

U.S. PATENT DOCUMENTS

| | | | |
|---|---|---|---|
| 2,987,934 A | 6/1961 | Thomas | |
| 4,403,976 A | 9/1983 | Takagi | |
| 5,516,333 A | 5/1996 | Benson | |
| 6,095,937 A | * 8/2000 | Aaen | .............. 474/10 |
| 6,120,399 A | 9/2000 | Okeson et al. | |
| 6,379,274 B1 | 4/2002 | Robert | |
| 6,569,043 B2 | * 5/2003 | Younggren et al. | .............. 474/19 |
| 6,743,129 B1 | * 6/2004 | Younggren et al. | .............. 474/19 |
| 2002/0032088 A1 | 3/2002 | Korenjak et al. | |
| 2002/0065156 A1 | 5/2002 | Younggren et al. | |
| 2004/0142781 A1 | * 7/2004 | Huddleston | .............. 474/19 |

OTHER PUBLICATIONS

EPO, International Search Report, Jul. 7, 2004.

* cited by examiner

*Primary Examiner*—David A. Bucci
*Assistant Examiner*—Vicky A. Johnson
(74) *Attorney, Agent, or Firm*—Devine, Millimet & Branch; Michelle Saquet Temple; Paul C. Remus

(57) ABSTRACT

The driven pulley comprises a first sheave and a second sheave coaxially mounted around a main shaft. The first sheave is fixed with reference to the main shaft while the other is allowed to slide and rotate with reference to the main shaft. The driven pulley is designed so that a portion of the second sheave can enter inside the first sheave. The return spring is also provided inside the driven pulley. This driven pulley can be designed as a reversible driven pulley by adding a second set of ramps and followers. The design of the driven pulley allows it to be constructed in a very compact manner and consequently, with a smaller weight compared to an equivalent conventional driven pulley.

10 Claims, 5 Drawing Sheets

DRIVEN PULLEY FOR A CONTINUOUSLY VARIABLE TRANSMISSION

BACKGROUND

Continuously variable transmissions (CVTs) are commonly used on a wide range of vehicles, such as small cars or trucks, snowmobiles, golf carts, scooters, etc. They typically comprise a driving pulley mechanically connected to a motor, a driven pulley mechanically connected to wheels or a track, possibly through another mechanical device such as a gear box, and a trapezoidal drivebelt transmitting torque between the driving pulley and the driven pulley. A CVT automatically changes the ratio as required by load and speed conditions, providing an increased torque under high loads at low speeds and yet controlling the rotation speed of the motor as the vehicle accelerates. A CVT may be used with all kinds of motors, such as internal combustion engines or electric motors.

The sides of the drivebelt are, on each pulley, gripped between two opposite sheaves that are coaxially mounted around a corresponding main shaft. Generally, in each pulley of a conventional CVT, one sheave, usually called "fixed sheave", is rigidly connected to one end of the corresponding main shaft. The other sheave, usually called "movable sheave", is free to slide and/or rotate with reference to the fixed sheave by means of bushings or the like.

At a low vehicle speed, the winding diameter of the drivebelt at the driving pulley is minimal and the winding diameter of the driven pulley is maximum. This is referred to as the minimum ratio since there is the minimum number of rotations or fraction of rotation of the driven pulley for each full rotation of the driving pulley.

Generally, when the rotation speed of the driving pulley increases, its movable sheave moves closer to the fixed sheave thereof under the effect of a centrifugal mechanism. This forces the drivebelt to wind on a larger diameter on the driving pulley and, consequently, on a smaller diameter on the driven pulley. The drivebelt then exerts a radial force on the sheaves of the driven pulley in addition to the tangential driving force by which the torque is transmitted. This radial force urges the movable sheave of the driven pulley away from the fixed sheave thereof. It is counterbalanced in part by a return force, which is typically generated by a spring inside the driven pulley or another biasing mechanism. It is also counterbalanced by a force generated by the axial reaction of the torque applied by the drivebelt on the driven pulley. This is caused by a cam system that tends to move the movable sheave towards the fixed sheave as the torque increases. The cam system typically comprises a cam plate having a plurality of symmetrically-disposed and inclined ramps on which respective cam followers are engaged. The followers are usually sliding buttons or rollers. The set of ramps or the set of followers is mounted on the movable sheave and the other is directly or indirectly connected to the main shaft in a rigid manner. The closing effect of the cam system on the drivebelt tension is then somewhat proportional to output torque.

Generally, at the maximum vehicle speed, the ratio is maximum as there is the maximum number of rotations or fraction of rotation of the driven pulley for each full rotation of the driving pulley. Then, when the vehicle speed decreases, the rotation speed of the driving pulley typically decreases as well since the rotation speed of the motor decreases. This causes, at some point, a decrease of the winding diameter of the driving pulley and a decrease of the radial force exerted by the drivebelt on the sides of the sheaves at the driven pulley. Ultimately, the driven pulley is allowed to have a larger winding diameter as the spring or another biasing mechanism moves the movable sheave back towards the fixed sheave.

Some CVTs are provided with reversible driven pulleys. A reversible driven pulley operates in a similar fashion than that of a conventional one, with the exception that the transmission ratio can be controlled during motor braking or when the vehicle is traveling in reverse. For instance, during motor braking, the torque is no longer coming from the motor to the wheels or track, but in the opposite direction. Similarly, when accelerating in reverse, the torque and the rotation will be in the reverse direction, the torque being transmitted from the motor to the wheels or track. A reversible driven pulley generally comprises a second set of ramps and a second set of followers. In use, one set of followers and its corresponding set of ramps are used when the torque is in one direction, the other set being used for the other direction.

A common problem to most driven pulleys is that they tend to be heavy and cumbersome, especially in applications where a high torque is transmitted. There was thus a need to provide a driven pulley having a new configuration and design which allows a more compact and efficient design.

SUMMARY

The object of the present invention is to provide a novel design for a driven pulley which allows obtaining a very compact and light device compared to a conventional driven pulley for a same application.

A narrower object of the present invention is to provide a compact and light driven pulley designed to be reversible, thus being capable of working in two directions of rotation and under reverse torque conditions in any of the directions of rotation.

These and other objects, aspects and advantages of the present invention are described in or apparent from the following detailed description of a preferred embodiment made in conjunction with the accompanying figures.

BRIEF DESCRIPTION OF THE FIGURES

Throughout the figures, analogous components are identified by the same reference numerals. Some parts which are not referred to correspond to the same components shown in other figures.

DESCRIPTION

Overview

Figure 1:
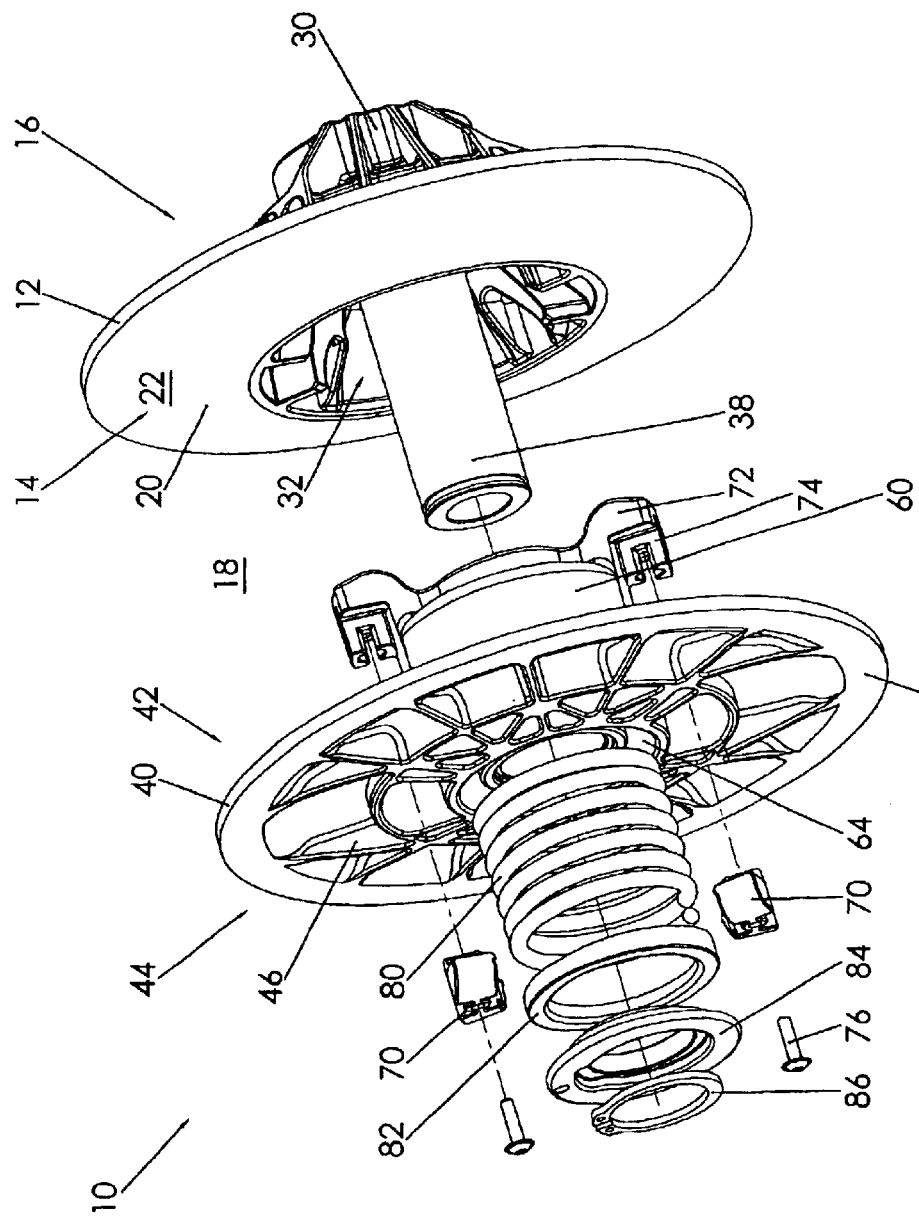
FIG. 1 is an exploded view of a driven pulley in accordance with a preferred embodiment of the present invention.

Referring to FIGS. 1 to 6, there is shown an example of a driven pulley (10) according to a preferred embodiment of the present invention. It is to be understood that the present invention is not limited to this precise embodiment and that various changes and modifications may be effected therein without departing from the scope or spirit of the present invention. For instance, although the illustrated driven pulley (10) is a reversible model, it is also possible to construct it without being reversible.

The driven pulley (10) is mounted on a main shaft (not shown) which defines a rotation axis. Generally, single parts of the driven pulley (10) are coaxially mounted around the rotation axis and multiples of a same part are symmetrically disposed around it in order to have a properly-balanced device, as apparent to a person skilled in art.

In use, the torque is transmitted to or from the main shaft by the driven pulley (10). This torque is supplied from or to a trapezoidal drivebelt (not shown). The trapezoidal drivebelt has one end wound on a driving pulley (not shown) and the other end wound on the driven pulley (10), more particularly around a first (12) and a second sheave (40). The torque usually goes from the driven pulley (10) to the main shaft. However, in some circumstances, especially if the driven pulley (10) is reversible, the torque can be transmitted in the opposite direction First Sheave The first sheave (12) has a first side (14) and a second side (16). Most portions of the first sheave (12), if not all, are part of a one-piece aluminum die-cast or the like. These portions are thus integrally-connected together. The first portion is a substantially annular and radially-extending main portion (20). The main portion (20) has a conical wall (22) provided on the first side (14) of the first sheave (12) and is designed to engage one side of the trapezoidal drivebelt.

Figure 3:
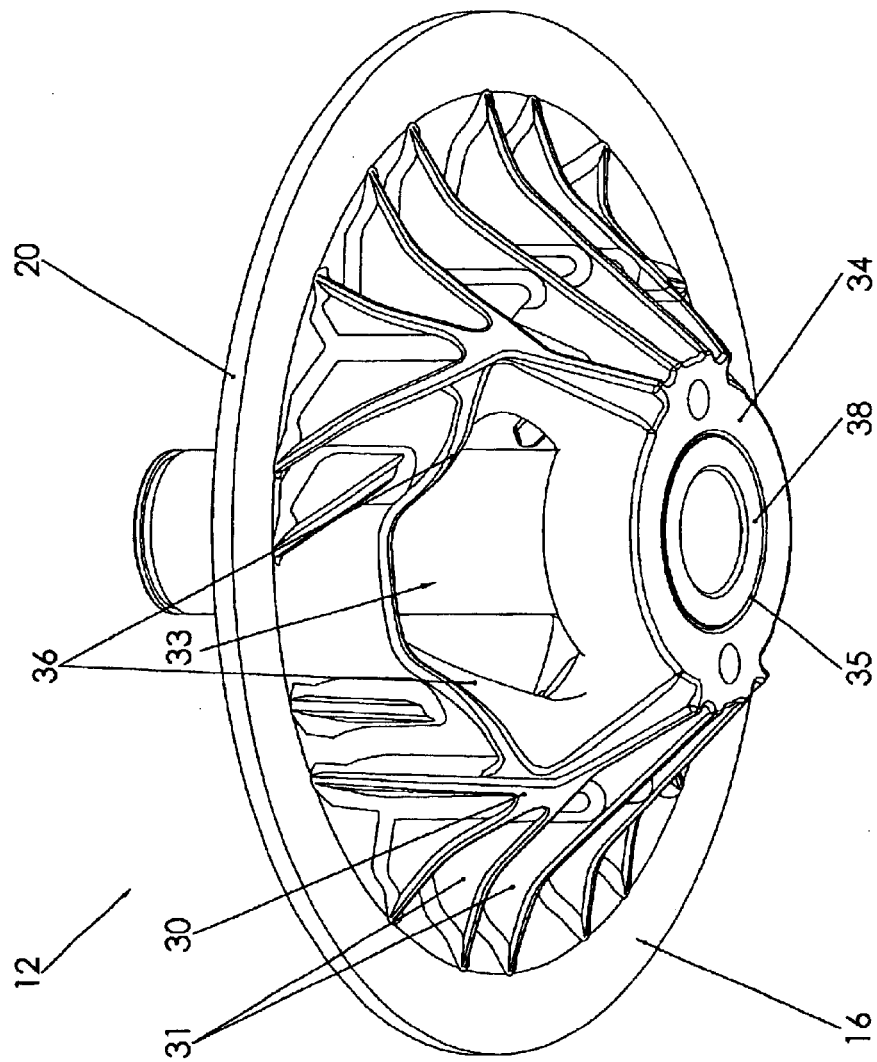
FIG. 3 is a perspective view of the second side of the first sheave shown in FIG. 1.

The first sheave (12) further comprises a substantially axially-extending bracket portion (30) connected to the main portion (20) and projecting from the second side (16) of the first sheave (12). The bracket portion (30) generally defines an internal enclosure (32) opened at least at the first side (14) of the first sheave (12). As best shown in FIG. 3, the back of the bracket portion (30) is preferably provided with a plurality of reinforcing ribs (31).

The first sheave (12) also comprises a sleeve portion (34) connected to the bracket portion (30) at a distal location with reference to the main portion (20). The sleeve portion (34) has a central hole (35) allowing the main shaft to be inserted therein. The sleeve portion (34) acts as a connection point between the driven pulley (10) and the main shaft. This allows the torque to be transmitted between them. This connection may be achieved in a number of ways. In the illustrated and preferred embodiment, the driven pulley (10) is rigidly connected to the main shaft by a mounting tube (38) which is to be coaxially-mounted over the main shaft. The mounting tube (38) has one end rigidly connected to the perimeter of the hole (35) of the sleeve portion (34). It also has a hollow interior in which the main shaft can be tightly inserted. Retention means, for instance a spline, a screw, internal teeth, etc. provide the torque-transmitting engagement, as apparent to a person skilled in the art. The mounting tube (38) can also be retained by welding, glue, etc. The length of the mounting tube (38) must be sufficient for allowing its free end to extend beyond the second sheave (40). This way, the mounting tube (38) can be used as a base for the second sheave (40) and the other parts. The driven pulley (10) can then be assembled in advance and simply fitted into place on the main shaft.

Figure 6:
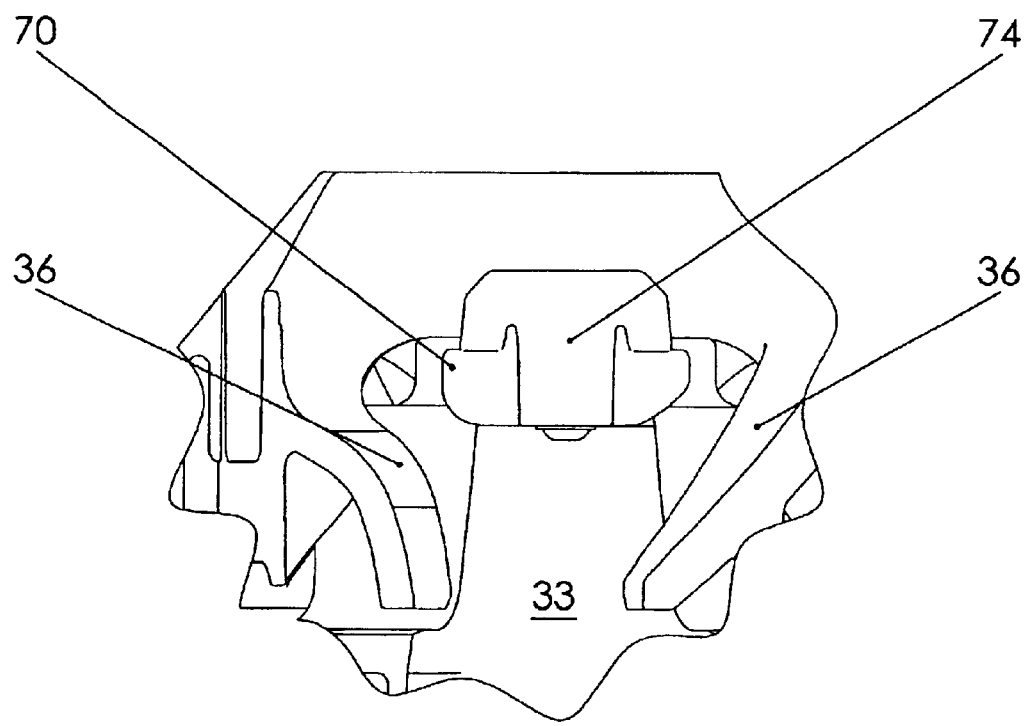
FIG. 6 is an enlarged view illustrating the double-sided sliding button between a pair of corresponding ramps.

The first sheave (12) further comprises at least one or two pairs of ramps (36), depending if the driven pulley (10) is reversible or not. The ramps (36) are preferably provided near the side openings (33). The ramps (36) are symmetrically-disposed with reference to the rotation axis and connected to the first sheave (12) inside the internal enclosure (32). When the driven pulley (10) is reversible, as in the preferred embodiment, two sets of ramps (36) are provided. FIG. 6 shows the relative position of the two ramps (36) of a same set in the preferred embodiment. One will be for the forward direction, the other being for the reverse direction. The ramps (36) of the first set are not necessarily identical to those of the second set.

Second Sheave

Referring back to FIG. 1, the driven pulley (10) further comprises a second sheave (40) having a first side (42) and a second side (44). The second sheave (40) is also preferably in the form of a one-piece item. Like the first sheave (12), the second sheave (40) has a substantially annular and radially-extending main portion (50). The main portion (50) of the second sheave (40) has a conical wall (52) on its first side (42). The conical wall (52) is preferably identical to the conical wall (22) provided on the first sheave (12). Once the sheaves (12,40) are assembled, both conical walls (22, 52) face each other and form between them a belt-receiving groove (18), as best shown in FIG. 2.

Figure 4:
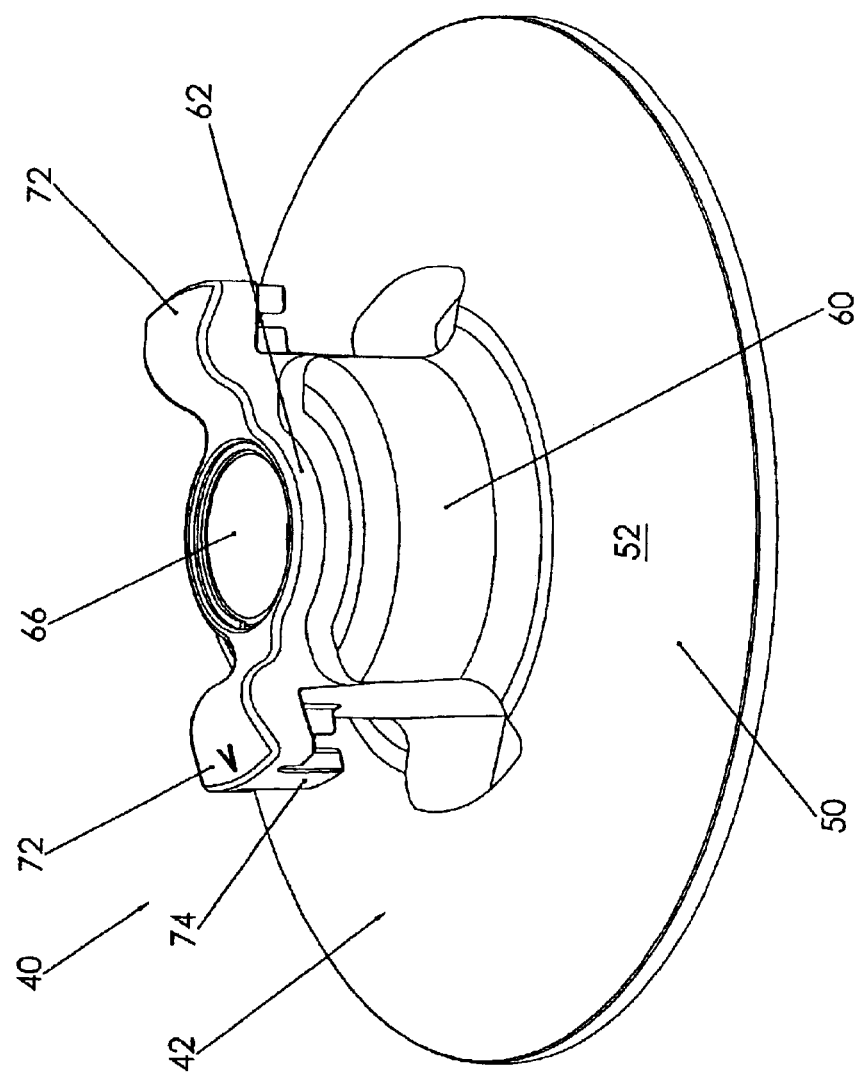
FIG. 4 is a perspective view of the first side of the second sheave shown in FIG. 1.

The second sheave (40) also comprises an outer sleeve portion (60) axially projecting from the first side (42) of the second sheave (40), as shown in FIG. 4. The outer sheave portion (60) is sized to fit into the internal enclosure (32) of the first sheave (12) once the driven pulley (10) is assembled.

An inner sleeve portion (62) is coaxially positioned inside the outer sleeve portion (60). The inner sleeve portion (62) has a smaller outer diameter than the inner diameter of the outer sleeve portion (60) so as to define between them an annular space (64) with a substantially closed bottom. As best shown in FIG. 4, the inner sleeve (62) comprises bushings (66) or the like on the interior side thereof. This allows the second sheave (40) to slide and rotate with reference to the main shaft, thus moving relative of the first sheave (12). The bushings (66) can be in engagement with the main shaft directly. However, in the preferred embodiment, the second sheave (40) is mounted on the mounting tube (38) and consequently, the bushings (66) are in sliding and rotational engagement with the mounting tube (38). Of course, the bushings (66) can be replaced by an equivalent, such as bearings or the like.

Figure 2:
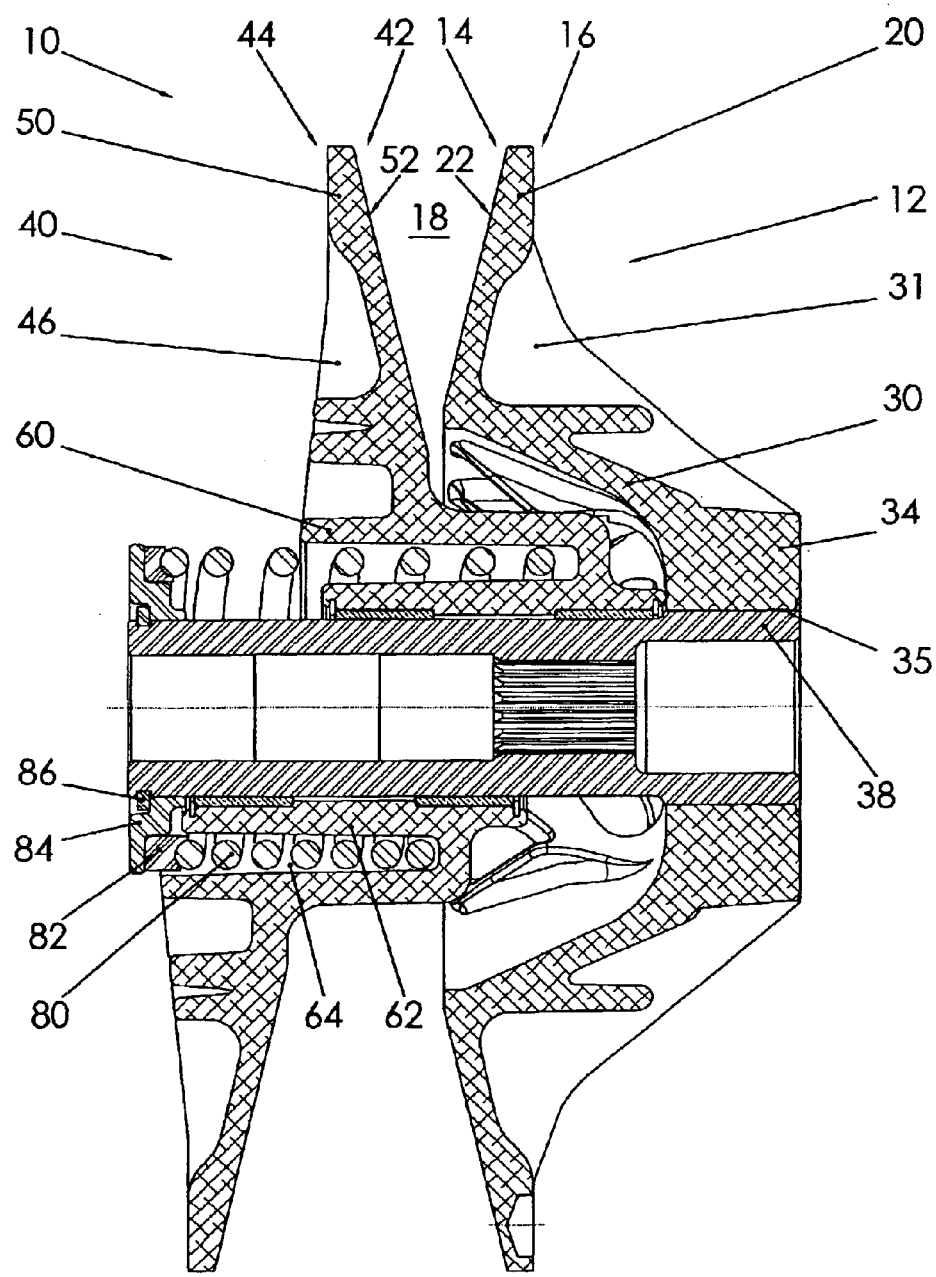
FIG. 2 is a cross-section view of the driven pulley shown in FIG. 1, the upper half showing the pulley at a low ratio position and the lower half showing the pulley at a high ratio position.

As best shown in FIGS. 2 and 4, the inner sleeve portion (62) slightly extends from the end of the outer sleeve portion (60). This provides a stop for limiting the minimum spacing between the first (12) and the second sheave (40). This is however optional.

Followers (70) and corresponding mounting supports (72) are symmetrically disposed on the outer sleeve portion (60). Each follower (70) can be in the form of a sliding button, a roller or the like, depending on the needs. The mounting supports (72) are configured and disposed to allow each follower (70) to engage a corresponding ramp (36). Each mounting support (72) projects radially from the outer sleeve portion (60) and comprises a clamp (74) where the follower (70) is installed. In the preferred embodiment, the followers (70) are installed in the clamps (74) and a screw (76) or another retaining element is used to fully maintain the follower (70) in place, as shown in FIG. 1.

When designing the driven pulley (10), the size of the internal enclosure (32) must be such that the outer sleeve portion (60) and the mounting supports (72) can be inserted therein. Preferably, the mounting supports (72) are projecting out of side openings (33) when the second sheave (40) is in place. This provides two main advantages. The first is that the internal enclosure (32) can be smaller when the mounting supports (72) are allowed to move within the side openings (33). The other advantage is that the followers (70) can be inspected and replaced without the need of disassembling the driven pulley (10).

The second side (44) of the second sheave (40) is provided with a plurality of reinforcing ribs (46), as shown in FIG. 2.

Spring

The driven pulley (10) comprises an axially-disposed helical spring (80) having one end resting against a fixed point at the closed bottom of the annular space (64) and an opposite end connected to a fixed location with reference to the first sheave (12). In the preferred embodiment, as shown in FIG. 2, the fixed end of the spring (80) rests against an optional protector (82), itself resting on a stop (84) held by a C-clip (86) connected to the mounting tube (38). The spring (80) is pre-loaded in compression and/or in torque, depending on the needs.

The purpose of the spring (80) is to create a return force urging the second sheave (40) towards the first sheave (12). This return force counterbalances the radial force exerted by the drivebelt on the conical walls (22,52). The spring (80) can be pre-loaded in torque, with or without a pre-load in compression, so as to force the followers (70) to move up the ramps (36). This also forces the second sheave (40) to move closer to the first sheave (12).

Operation

In use, the outer sleeve portion (60) of the second sheave (40) is housed in the internal enclosure (32) of the first sheave (12). Each follower (70) of a same set engages a corresponding ramp (36). The torque, if transmitted from the drivebelt, has one half going through the first conical wall (22) and a second half going through the second conical wall (52). The torque in the first sheave (12) is directly transmitted to the main shaft by the bracket portion (30), the sleeve portion (34) and then the optional mounting tube (38). The other half of the torque, in the second sheave (40), is transmitted to the outer sleeve portion (60), the mounting supports (72) and then the followers (70). The followers (70) transmit the torque in their turn to the ramps (36), that being added to the first torque half and following the same path.

Figure 5:
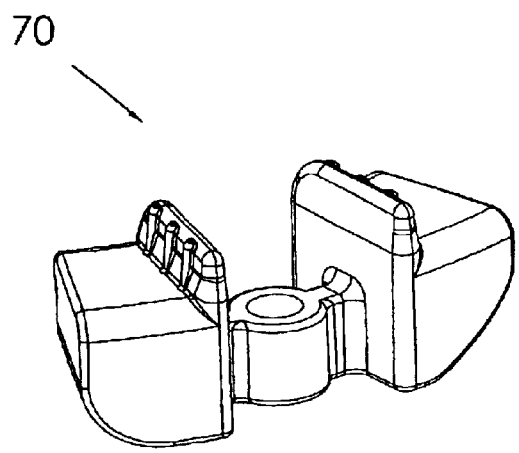
FIG. 5 is an enlarged view showing an example of a double-sided sliding button.

When the driven pulley (10) is designed to be reversible, as in the preferred embodiment, doubled-sided sliding buttons (70) can be provided, each side of the follower being capable of engaging a corresponding ramp (36). An example of a double-sided sliding button (70) is shown in FIG. 5. As shown in FIG. 6, one side of the sliding button (70) can engage one ramp (36) while the other can engage the opposite ramp (36). The driven pulley (10) will go through a short transition when the torque changes direction. In that case, the second sheave (40) will slightly rotate with reference to the first sheave (12), thereby changing the side of the sliding button (70) and the set of ramps (36) being used. It should be noted that a damping element can be mounted between the sliding button (70) and its clamp (74) in order to absorb the shock caused when the sliding button (70) is brought into contact with the corresponding ramp (36).

Advantages

As can be appreciated, the present invention allows the driven pulley (10) to be constructed in very compact manner and consequently with a smaller weight compared to an equivalent conventional driven pulley. Another advantage is that the followers (70) can be installed, inspected and replaced after the assembly of the driven pulley (10).

What is claimed is:

1. A driven pulley for use on a main shaft defining a rotation axis, the driven pulley comprising:
   a first sheave having a first side and a second side, the first sheave comprising:
      a substantially annular and radially-extending main portion, the main portion having a conical wall provided on the first side of the first sheave;
      a substantially axially-extending bracket portion connected to the main portion and projecting from the second side of the first sheave, the bracket portion defining an internal enclosure opened at the first side of the first sheave;
      a sleeve portion connected to the bracket portion at a distal location with reference to the main portion; and
      at least two ramps symmetrically-disposed with reference to the rotation axis and directly connected to the first sheave inside the internal enclosure;
   a second sheave having a first side and a second side, the second sheave comprising:
      a substantially annular and radially-extending main portion, the main portion of the second sheave having a conical wall on the first side thereof, which conical wall faces the conical wall of the first sheave to form a belt-receiving groove between them;
      an outer sleeve portion axially projecting from the first side of the second sheave;
      an inner sleeve portion coaxially positioned inside the outer sleeve portion, the inner sleeve portion and outer sleeve portion defining between them an annular space with a substantially closed bottom; and
      at least two followers and corresponding mounting supports symmetrically disposed on the outer sleeve portion; and
   an axially-disposed helical spring having one end resting against the closed bottom of the annular space and an opposite end connected to a fixed location with reference to the first sheave;
   whereby, in use, the outer sleeve portion of the second sheave is housed in the internal enclosure of the first sheave and each follower is configured and disposed for being in engagement with a corresponding ramp, the sleeve portion of the first sheave being rigidly connected to the main shaft while the inner sleeve portion of the second sheave being free to rotate and slide with reference to the main shaft.

2. The driven pulley in accordance with claim 1, further comprising a mounting tube rigidly connected inside the sleeve portion, the mounting tube having an end projecting inside the internal enclosure and extending beyond the first sheave; whereby the second sheave and the spring are mounted around the mounting tube.

3. The driven pulley in accordance with claim 1, wherein the bracket portion of the first sheave comprises side openings, each being substantially aligned with the ramps.

4. The driven pulley in accordance with claim 1, wherein two sets of at least two ramps are provided, each ramp of the first set facing a corresponding ramp of the second set, both being opposite the other; whereby each ramp is engageable by a corresponding follower.

5. The driven pulley in accordance with claim 4, wherein each follower is a double sided sliding button.

6. A driven pulley for use on a main shaft defining a rotation axis, the driven pulley comprising:
   a first sheave having a first side and a second side, the first sheave comprising:

a substantially annular and radially-extending main portion, the main portion having a conical wall provided on the first side of the first sheave;

a substantially axially-extending bracket portion connected to the main portion and projecting from the second side of the first sheave, the bracket portion defining an internal enclosure opened at the first side of the first sheave;

a sleeve portion connected to the bracket portion at a distal location with reference to the main portion; and at least two ramps symmetrically-disposed with reference to the rotation axis and directly provided on the first sheave inside the internal enclosure;

a second sheave having a first side and a second side, the second sheave comprising:

a substantially annular and radially-extending main portion, the main portion of the second sheave having a conical wall on the first side thereof, which conical wall faces the conical wall of the first sheave to form a belt-receiving groove between them;

an outer sleeve portion axially projecting from the first side of the second sheave;

an inner sleeve portion coaxially positioned inside the outer sleeve portion, the inner sleeve portion and outer sleeve portion defining between them an annular space with a substantially closed bottom; and at least two outwardly-projecting followers and corresponding mounting supports symmetrically provided on the outer sleeve portion; and an axially-disposed helical spring having one end resting against the closed bottom of the annular space and an opposite end connected to a fixed location with reference to the first sheave, whereby, in use, the outer sleeve portion of the second sheave is housed in the internal enclosure of the first sheave and each follower is configured and disposed for being in engagement with a corresponding ramp, the sleeve portion of the first sheave being rigidly connected to the main shaft while the inner sleeve portion of the second sheave being free to rotate and slide with reference to the main shaft.

7. The driven pulley in accordance with claim 6, further comprising a mounting tube rigidly connected inside the sleeve portion, the mounting tube having an end projecting inside the internal enclosure and extending beyond the first sheave, whereby the second sheave and the spring are mounted around the mounting tube.

8. The driven pulley in accordance with claim 6, wherein the bracket portion of the first sheave comprising side openings, each being substantially aligned with the ramps.

9. The driven pulley in accordance with claim 6, wherein two sets of at least two ramps are provided, each ramp of the first set facing a corresponding ramp of the second set, both being opposite the other, whereby each ramp is engageable by a corresponding follower.

10. The driven pulley in accordance with claim 9, wherein each follower is a double sided sliding button.

\* \* \* \* \*